United States Patent [19]

Sugiura

[11] Patent Number: 5,662,800
[45] Date of Patent: Sep. 2, 1997

[54] OIL/WATER PURIFYING APPARATUS

[76] Inventor: Eiichi Sugiura, 149, Matsumotocho, Hekinan-shi, Aichi, Japan

[21] Appl. No.: 133,953

[22] Filed: Dec. 17, 1987

[30] Foreign Application Priority Data

May 8, 1987 [JP] Japan .................. 62-112732

[51] Int. Cl.$^6$ .................................. B01D 25/00
[52] U.S. Cl. .................. 210/234; 210/238; 210/440; 210/443
[58] Field of Search .................... 210/167, 168, 210/232, 238, 443, 440, 234; 55/490, 501

[56] References Cited

U.S. PATENT DOCUMENTS

| | | | |
|---|---|---|---|
| 3,508,657 | 4/1970 | Cooper | 210/232 |
| 3,628,662 | 12/1971 | Kudlaty | 210/234 X |
| 4,017,397 | 4/1977 | Copeland | 210/238 |
| 4,202,771 | 5/1980 | Hoff | 210/440 X |
| 4,588,503 | 5/1986 | Sugiura | 210/232 |
| 4,652,285 | 3/1987 | Greene | 55/501 X |

*Primary Examiner*—Thi Dang
*Attorney, Agent, or Firm*—Adams & Wilks

[57] ABSTRACT

A liquid purifying apparatus comprising; a cylindrical casing having a bottom and a tapered side wall which is formed so that an inner diameter of the cylindrical casing is made larger at an upper portion than a lower portion; a roll filter member inserted in the casing having fastening band arranged to surround the roll filter member and formed cylindrically so that the cylindrical fastening band having a diameter which is substantially equal at every portion along an axis thereof to the inner diameter of the casing at its lower portion; and a tapered gap defined between the casing and the roll filter member so that the gap is enlarged toward its upper portion.

8 Claims, 1 Drawing Sheet

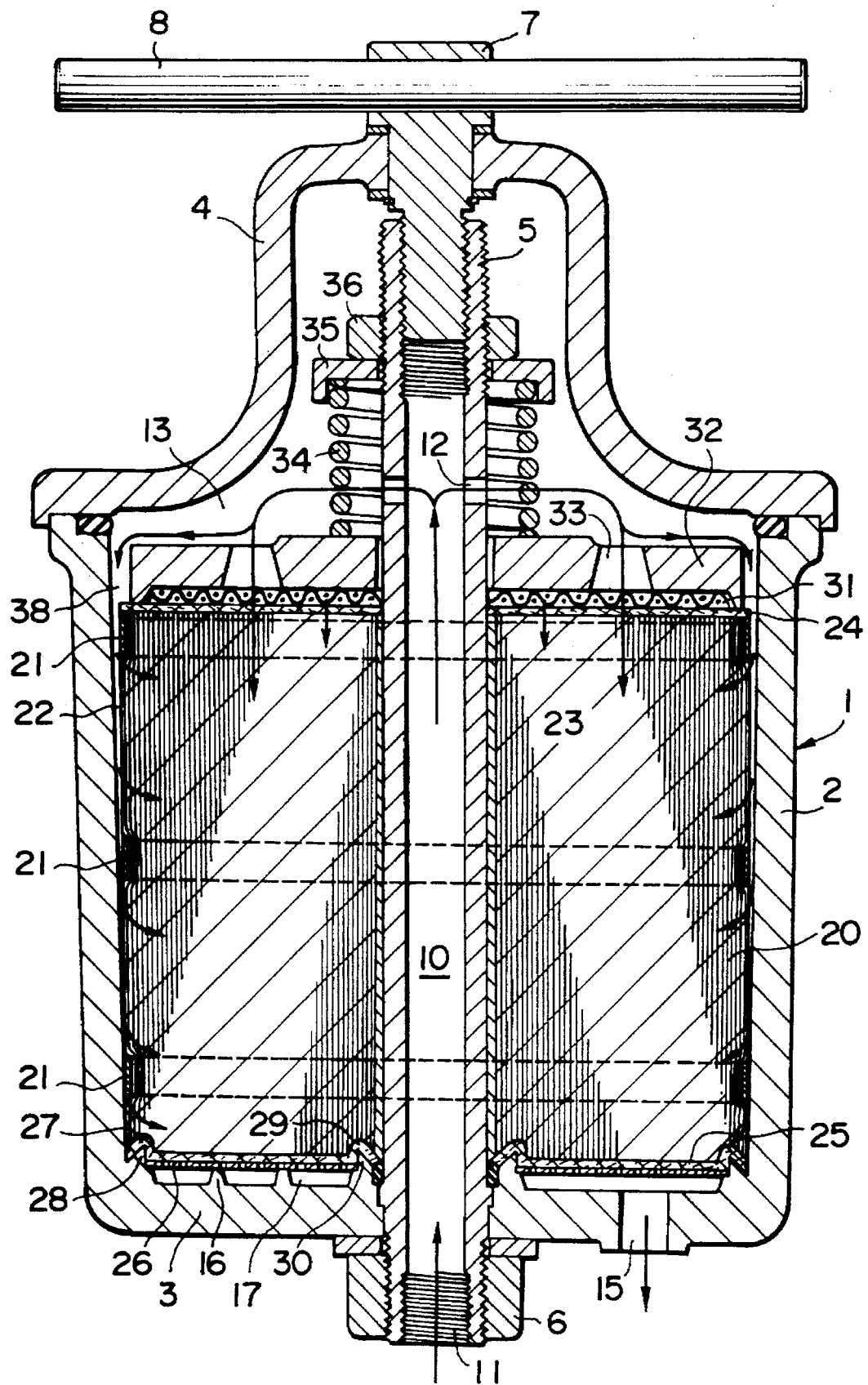

OIL/WATER PURIFYING APPARATUS

BACKGROUND OF THE INVENTION

1. Field of the Invention

The present invention relates to an apparatus for purifying liquids such as lubricating oil, machine oil, or a liquid such as water, and particularly relates to a purifying apparatus having a filter made of paper, a sheet, or fabric which is wound in the form of a roll.

2. Description of the Prior Art

U.S. Pat. No. 4,688,503 entitled "LIQUID FILTER ASSEMBLY", granted May 13, 1988 to the inventor of this application, discloses a structure, in a purifying apparatus having a roll filter member, which is effective in preventing cracks from occurring in the roll filter member. According to the proposal described in this patent, the roll filter member is firmly coaxially inserted in a metal casing having a cylindrical cross section, and a non-woven fabric sheet-like filter element is disposed on the roll filter member at its upper end surface. A perforated retainer disc having bias means is mounted on the sheet-like filter element. A contaminated liquid including impurities is pressured by a pump, led into the metal casing, and then fed to the sheet-like filter element through the holes in the disc. After being preliminarily filtered by the sheet-like filter element, the liquid is passed through the roll filter member so as to be substantially completely purified by the roll filter member. If clogging occurs as accumulated used time or accumulated filtered quantity increases, the pressure for supplying the contaminated liquid must be raised. The sheet-like filter element acts not only to operate as a primary filter but to dispersively supply pressured contaminated liquid to the roll filter member to thereby prevent cracks from occurring by concentration of the highly pressured contamination liquid at a weak portion of the roll filter member. The proposal is particularly effective in that high supply pressure necessary to obtain high efficiency can be maintained.

SUMMARY OF THE INVENTION

An object of the present invention is to provide a liquid purifying apparatus having a roll filter which can be realized together with the above proposal by the inventor of this application.

Another object of the present invention is provide a liquid purifying apparatus in which high filtering capability can be maintained for a long time.

A further object of the present invention is to provide a liquid purifying apparatus in which constituent parts of the apparatus can be easily manufactured and can be easily assembled.

In order to attain the above objects, according to the present invention, the liquid purifying apparatus comprises: a cylindrical casing provided with a removably mounted cap and having an inlet for a liquid to be purified and an outlet for a purified liquid, the casing having a bottom and a tapered side wall which is formed so that an inner diameter of the cylindrical casing is made larger at an upper portion than a lower portion; a roll filter member coaxially inserted in the casing and disposed between the inlet and the outlet, the roll filter member having fastening band means arranged to surround the roll filter member and formed cylindrically so that the cylindrical fastening band means has a diameter which is substantially equal at every portion along an axis thereof to the inner diameter of the casing at its lower portion; and a tapered gap defined between the casing and the roll filter member so that the gap is enlarged toward its upper portion.

According to the present invention, there are provided a first liquid channel through which a pressured liquid to be filtered is caused to flow from the upper end surface of the roll filter member to the outlet through the inside of the roll filter member in its axial direction, and a second liquid channel through which the liquid is caused to flow from the taper gap formed between the casing and the circumferential edge of the roll filter member to the inside of the roll filter member in its radial direction and then caused to flow, together with the liquid passed through the first liquid channel, through the inside of the roll filter member in the axial direction thereof. Accordingly, the substantial filtering area can be increased. According to the present invention, there is such a further advantage that it becomes extremely easy to produce the casing through casting because the inner diameter of the casing is made larger at its upper portion than that at its lower portion.

BRIEF DESCRIPTION OF THE DRAWING

The single drawing FIGURE is a longitudinal section showing an embodiment of the liquid purifying apparatus according to the present invention.

DETAILED DESCRIPTION OF THE PREFERRED EMBODIMENT

Referring to the drawing, an embodiment will be described hereunder. A casing 1 is provided with a side wall 2 formed cylindrically so that an inner diameter of the cylindrical side wall 2 at its upper portion is larger than that at its lower portion, a bottom 3, and a cap 4 removably mounted at an opening portion of the cylindrical side wall 2. A conduit 5 is firmly fixed at its bottom end to the casing 1 at its bottom center by s fastening nut 6. The conduit 5 extends coaxially with the casing 1 and supports at its upper end an attaching bolt 7 for attaching the cap 4. A handle bar 8 is fixed to the attaching bolt 7, and the cap 4 is removably mounted to the casing 1 by the operation of the handle bar 8. The conduit 5 is provided with a tubular path 10 so as to lead a liquid supplied from an inlet 11 to an upper space 13 of the casing 1 through an outlet 12. In this embodiment the upper end of the path 10 is closed by the attaching bolt 7.

A roll filter member generally designated by the reference numeral 20 is filled in the casing 1 coaxially with the casing 1. The roll filter member 20 is made such that a web such as paper, a synthetic resin sheet, or fabric is wound around a core 23 and is provided with non-woven fabric sheet-like filter elements 24 and 25 at upper and lower end surfaces of the roll filter member 20 respectively in accordance with the teaching of the disclosure of the above U.S. Pat. No. 4,588,503 granted to the inventor of this application.

The upper and lower non-woven fabric sheet-like filter elements 24 and 25 may be supported by an adhesive applied partially onto the roll filter element 20 at the upper and lower end surfaces thereof respectively. Bands 21, the number of which is three in this embodiment, are provided so as to surround the roll filter member 20. Each of the bands 21 fastens the roll filter member 20 so as to prevent the roll filter member 20 from being radially deformed or expanded, and the bands 21 hold the roll filter member 20 in the shape of a cylindrical body having a diameter which is substantially equal at every portion along an axis thereof to the inner diameter of the casing at its lower portion. Accordingly, a tapered gap 22 enlarged gradually axially upwards is formed between the side wall 2 of the casing 1 and the roll filter member 20 in the casing 1.

A disc-like retainer 32 having plurality of holes 33 is mounted on the upper portion of the roll filter member 20 provided in the casing 1, and a porous metal member 31 such as a punched plate or metal net is provided on the retainer 32 at its lower side. A gap 38 which is larger than the above-mentioned taper gap 22 is formed between the side wall 2 of the casing 1 and the circumferential edge of the retainer 32. The retainer 32 is biased by a spring 34 so as to urge the porous metal member 31 and the sheet-like filter element 24 against the upper end surface of the roll filter member 20 and also to fix the roll filter member 20 in the casing 1. The spring 34 is provided with a washer 35 which engages with a nut 36 screwed on the conduit 5.

Protrusions 16 defining paths 17 communicating with an outlet 15 are formed on the bottom 3 of the casing 1, a punched metal 28 is disposed on the protrusions 16, and the roll filter member 20 having the lower sheet-like filter element 25 is mounted on the punched metal plate 28. Two annular ribs 28 and 30 are formed on the bottom of the casing 3. One annular rib 28 is disposed at an outer corner of the punched metal plate 26, and the other annular rib 30 is disposed in the vicinity of the conduit 5 inside the punched metal plate 26. Each of the annular ribs 28 and 30 is formed higher in height than the protrusions 16 so as to be projected from the upper surface of the punched metal plate 26. Annular grooves 27 and 29 are formed in the roll filter member 20 having the lower sheet-like filter element 25 at its lower outer edge portion and its lower inner edge portion respectively, and the annular grooves 27 and 29 are engaged with the annular ribs 28 and 30 on the bottom 3 of the casing 1 respectively.

The pressured liquid led into the upper space 13 in the casing 1 is fed into the porous metal member 31 and the upper sheet-like filter element 24 through the plurality of holes 33 formed in the retainer 32. After being dispersed and preliminarily filtered, the pressured liquid is led into the roll filter member 20 so as to be substantially completely purified, and then the pressured liquid reaches the outlet 15 through the lower sheet-like filter element 25 and the punched-metal plate 26. In that case, according to the present invention, in addition to a first liquid channel which passes through the holes 33 in the retainer 32, a second liquid channel is provided so as to extend from the gap 38 formed between the retainer 32 and the casing side wall 2 to the roll filter member 20 through the tapered gap 22 formed between the roll filter member 20 and the casing side wall 2, so that the filtered flow rate per unit time can be increased. Although the pressured liquid passing through the first liquid channel operates to expand the roll filter member 20 outwards radially, the roll filter member 20 is surrounded at its circumference by the fastening bands 21 so as to be prevented from being enlarged, so that the second liquid channel is maintained so as not to be closed by the enlargement of the roll filter member 20. The pressured liquid passing through the second liquid channel tends to compress the roll filter member 20 radially inwards so as to expand the tapered gap 22 to thereby form a leakage channel which does not pass through the roll filter member 20. However, the annular groove 27 formed in the lower outer edge portion of the roll filter member 20 having the lower sheet-like filter element 25 is firmly engaged with the outer annular rib 28 formed on the casing bottom 3, so that the roll filter member 20 is never transformed at its lower portion. Accordingly, there occurs no possibility that a leakage channel is formed between the side wall 2 of the casing 1 and the circumferential edge of the roll filter member 20. According to the present invention, the inner diameter of the casing 1 is made larger at its upper portion than at its lower portion, so that it becomes extremely easy to produce the casing 1 through casting.

What is claimed is:

1. A liquid purifying apparatus comprising:

a casing positionable in an upstanding position and having an upper end, a lower end, and a side wall interconnecting the upper and lower ends, the side wall tapering inwardly in the downward direction such that the casing has a larger inner diameter at its upper portion than at its lower portion; a conduit extending coaxially within the casing through a central portion of the end of the casing for introducing liquid to be purified into the casing; a roll filter member disposed coaxially within the casing and surrounding the conduit such that the upper end portion of the conduit extends above the upper end of the roll filter member, the roll filter member having a length dimension less than the casing and being oriented so as to define within the casing an open space above an upper end face of the roll filter member; a sheet-like filler element disposed on and covering the upper end face of the roll filter member; a disc-like retainer having a pair of opposed flat surfaces and movably disposed within the casing and resting on the sheet-like element so as to press the sheet-like filter element against the upper end face of the roll filter member, the disc-like retainer having openings therethrough which open at the flat surfaces thereof to define first liquid flow paths from the open space within the casing above the roll filter member down to the sheet-like filter element; means for biasing the disc-like retainer to press the sheet-like filter element against the upper end face of the roll filter member; means encircling the outer periphery of the roll filter member to hold the roll filter member in a substantially cylindrical configuration having an outer diameter substantially equal to the inner diameter of the casing side wall at its lower portion, the cylindrically configured roll filter member coacting with the inwardly tapering casing side wall to define therebetween a tapered annular gap defining a second liquid flow path which opens at its upper end into the open space within the casing; an inlet in the upper end portion of the conduit in the region where the conduit extends in the open space above the upper end of the roll filter member for introducing the liquid to be purified into said open space so that the liquid can flow downwardly through the first and second liquid flow paths and through the roll filter member; and an outlet in the lower end of the casing for removing purified liquid after it has flowed through the roll filter member.

2. A liquid purifying apparatus according to claim 1; wherein the roll filter member has an annular groove formed in an outer peripheral edge portion of a lower end face thereof, and the casing lower end has an upwardly projecting annular rib which is formed on an outer peripheral edge portion thereof and which detachably engages with the annular groove of the roll filter member.

3. A liquid purifying apparatus according to claim 2; including another sheet-like filter element disposed on and covering the lower end face of the roll filter member, an outer peripheral portion of said sheet-like filter element being interposed between the detachably engaged annular rib of the casing and the annular groove of the roll filter member.

4. A liquid purifying apparatus according to claim 1; wherein the means encircling the outer periphery of the roll filter member comprises a plurality of fastening bands encircling the roll filter member at axially spaced locations therealong.

5. A liquid purifying apparatus according to claim 1; including means formed at the lower, outer corner edge of the roll filter member for preventing leakage of the liquid from the second flow path to the outlet.

6. A liquid purifying apparatus according to claim 5; wherein the means for preventing leakage of the liquid comprises an annular groove in the lower end face of the roll filter member, and an annular rib projecting upwardly from the casing lower end and firmly engaged in the annular groove.

7. A liquid purifying apparatus according to claim 6; wherein the means encircling the outer periphery of the roll filter member comprises a plurality of fastening bands encircling the roll filter member at axially spaced locations therealong.

8. A liquid purifying apparatus according to claim 5; wherein the means encircling the outer periphery of the roll filter member comprises a plurality of fastening bands encircling the roll filter member at axially spaced locations therealong.

* * * * *